No. 764,174. Patented July 5, 1904.

UNITED STATES PATENT OFFICE.

WILLIAM H. BRISTOL, OF HOBOKEN, NEW JERSEY.

THERMO-ELECTRIC ELEMENT.

SPECIFICATION forming part of Letters Patent No. 764,174, dated July 5, 1904.

Application filed February 18, 1904. Serial No. 194,361. (No specimens.)

*To all whom it may concern:*

Be it known that I, WILLIAM H. BRISTOL, a citizen of the United States of America, residing at Hoboken, in the county of Hudson and State of New Jersey, have invented certain new and useful Improvements in Thermo-Electric Elements, of which the following is a specification.

My invention has reference to thermo-electric couples and thermic batteries, and has for its objects, first, to increase the electromotive force of the couple or battery, and, secondly, to provide a comparatively low-priced couple particularly adapted for use in instruments for measuring high temperatures—such, for instance, as pyrometers for measuring furnace temperatures reaching such high degrees as to render the ordinary thermo-electric couples useless, since their melting-point is either below the temperature to be measured or they are rapidly burned out in such manner as to render them useless.

For the purpose of my invention I provide a negative and a positive element of comparatively high electromotive force made of materials adapted to withstand high temperatures without melting or impairment of electromotive force by reason of change in their inherent structure or nature. I also employ materials which by reason of their inherent strength and structure do not deteriorate to a material extent, and therefore can be used for a long time under exposure to high temperature.

I do not wish it to be understood that the couples embodying my invention are to replace platinum and platinum-alloy couples for extremely high temperatures—for instance, those above the melting-point of steel; but my said couples are adapted for all commercial temperatures, such as those used in tempering steel, for ordinary furnaces, kilns, and in other cases where abnormal temperatures are not employed.

In carrying out my invention I employ for the positive element an alloy of metals possessing a high degree of strength and high resistance to heat, the most suitable being tungsten or wolfram steel. Tungsten or wolfram steel is an alloy of iron, carbon, and tungsten, generally formed by reducing wolfram to ferrotungsten and adding from five to thirty per cent. of the latter to the iron and melting the mixture in pots with a flux. Bessemer and open-hearth steel to which tungsten is added may be used, as also what is commonly known as "Mushet" steel, which contains tungsten. In practice I prefer to use for the positive element commercial tungsten steel containing from five to twenty-five per cent. of tungsten. For the negative element I employ substantially pure nickel, as this withstands high temperatures and does not oxidize or rapidly deteriorate. Of course it is to be understood that I may use alloys of nickel—such, for instance, as German silver; but for best results at high temperatures the quantity of nickel should greatly preponderate. For lower temperatures, as a red heat—say 1,200° Fahrenheit—German silver will give good results when combined with tungsten steel as an element. The two elements can be readily welded together electrically in a suitable furnace or in an arc or in a welding-machine, and they may be assembled in any preferred form. Of course other known means for uniting elements of a high melting-point may be employed. For lower temperatures the elements may be brazed together; but the melting-point of the solder used should be as high as possible, so that the joint will hold under moderate temperatures, as has heretofore been the practice. Of course by welding the elements together they can be raised to a temperature equal to the melting-point of one element or the other without affecting the juncture, while when the elements are brazed together they would separate at the juncture when the temperature reached the melting-point of the solder, which would necessarily have to be below that of the elements themselves, so as to permit brazing.

It is evident that a number of the couples herein described can be placed in series or otherwise for forming a thermic battery for use in the commercial arts.

I have found by experiment that other steel alloys—such, for instance, as manganese and chrome steels—give good results with pure nickel and alloys in which nickel greatly predominates. Therefore I do not wish to restrict myself to tungsten or wolfram steel, although the best results are obtained with this steel alloy.

What I claim as new is—

1. A thermo-electric couple, one element of which consists of tungsten or wolfram steel.

2. A thermo-electric couple, one element of which consists of tungsten or wolfram steel and the other element of nickel.

3. A thermo-electric couple, one element of which consists of tungsten or wolfram steel and the other of nickel alloy.

4. A thermo-electric couple, one element of which consists of an alloy of tungsten or wolfram and steel in the proportion of five to twenty-five per cent. tungsten or wolfram and the balance steel.

5. A thermo-electric couple, one element of which consists of an alloy of iron and tungsten or wolfram.

6. A thermo-electric couple, one element of which consists of steel alloy and the other element of substantially pure nickel.

7. A thermo-electric couple, one element of which consists of a steel alloy substantially as described.

In testimony whereof I have hereunto set my hand in the presence of two subscribing witnesses.

WILLIAM H. BRISTOL.

Witnesses:
A. FABER DU FAUR, Jr.,
RAENA H. YUDIZKY.